E. EMMERT.
Combined Seed-Sowers and Cultivators.
No. 156,416. Patented Nov. 3, 1874.
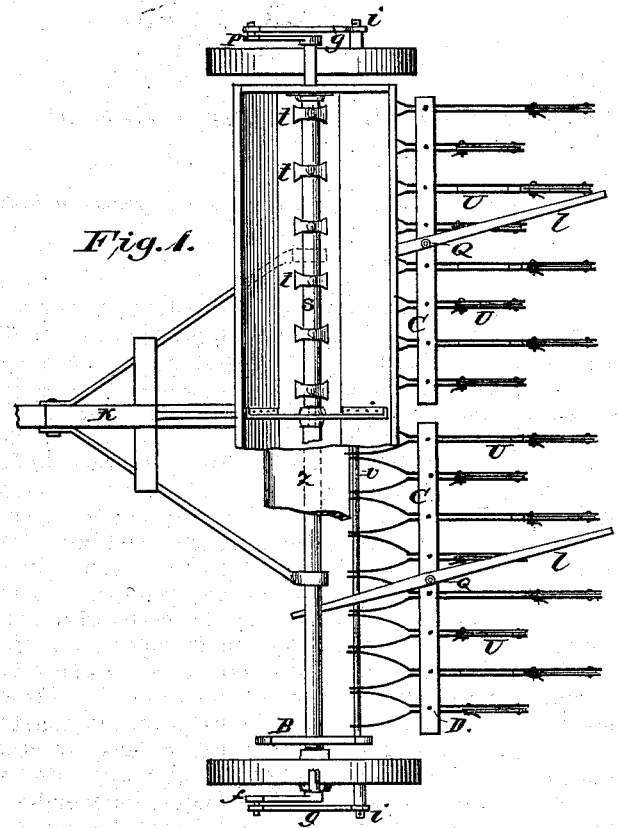
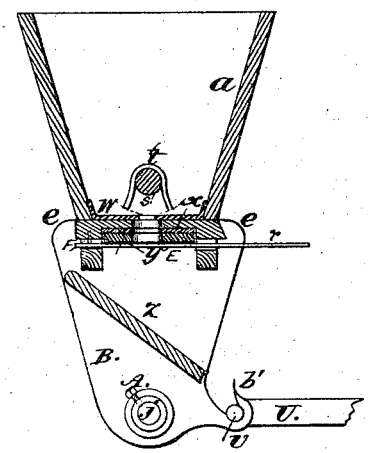
Fig. 3.
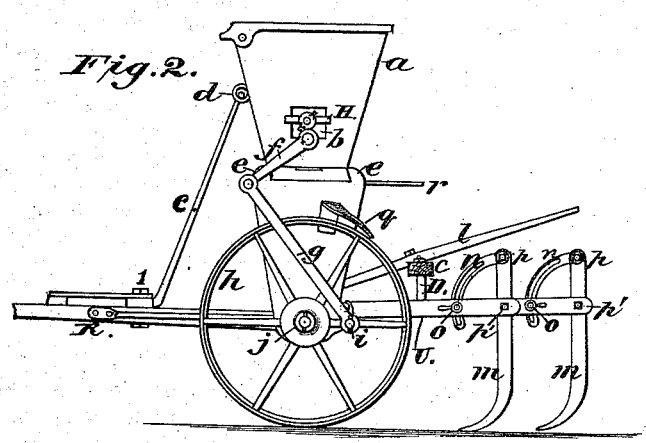
Fig. 2.
Witnesses.
E. H. Bruckner.
E. Kirchner.
Inventor.
Ezra Emmert.

UNITED STATES PATENT OFFICE.

EZRA EMMERT, OF FRANKLIN GROVE, ILLINOIS.

IMPROVEMENT IN COMBINED SEED-SOWERS AND CULTIVATORS.

Specification forming part of Letters Patent No. 156,416, dated November 3, 1874; application filed July 21, 1873.

*To all whom it may concern:*

Be it known that I, EZRA EMMERT, of Franklin Grove, in the county of Lee and State of Illinois, have invented certain new and useful Improvements in Combined Seed-Sowers and Cultivators, of which the following is a specification:

The invention consists in combining the axle, a front brace, and side plates for supporting the seed-box and operative parts of a seeder and cultivator, as hereinafter fully set forth, and as shown in the drawings, wherein—

Figure 1 is a top view of the machine, with part of the seed-box removed to show working parts and connections. Fig. 2 is an end elevation of the machine. Fig. 3 is a transverse vertical section of the seed-box, showing the supporting-plates and hollow axle.

$a$ represents the seed-box, mounted on wheels $h$, said wheels revolving on hollow axle $j$, to which the draft-pole $k$ is attached. The bottom $w$ of the box is flanged, so that the flanges fit into the sides of the said box; and said bottom is perforated with holes or seed-cells J, beneath which is fitted a sliding gage-plate, $x$, by adjusting which the seed-cells may be contracted as desired, thus regulating the discharge.

In the upper part of the seed-box $a$ are placed the shafts $s$ longitudinally, each shaft extending half the length of the box, and having its inner bearing in a partition fitted securely within said box. The agitator-shafts $s$ are placed in line with each other, and to their sides forked pendants or agitators $t$ are attached, said agitators working directly over the seed cells in the bottom of the seed-box. The outer end of each shaft $s$ is provided with a crank, $f$, and both these cranks are connected, by pitmen, $g$, with the crank-pins $i$ on the wheels $h$. At each end of seed-box $a$ is cut a square hole, in which is fitted a plate, $b$, on the under sides of which are confined the ends of the agitator-shafts. These plates are locked in said holes by a button, H, extending across the outside of the same. (See Fig. 2.)

By this construction the shafts may be readily removed from the box.

$y$ is a cut-off, moved by a handle, $r$, pivoted thereto at E, and to the bottom of the seed-box at F. B are the support-plates, fitted to axle $j$, and secured in position by set-screws A. At the top of the support-plates, and on each side, front and rear, are jaws $e$. The front jaw is straight on its inner edge, and the rear jaw beveled, so as to embrace the bottom of the seed-box. A brace, $c$, attached firmly to the draft-pole by bolt 1, engages in an eye, $d$, in the front of the seed-box. This arrangement holds the seed-box firmly in position, and permits its easy removal. An inclined guide-board, $z$, is placed longitudinally under the seed-box, with its upper end in front of the seed-cells, whereby an even and undisturbed distribution of the seed is effected. The cultivator-bars U are attached together in sections of eight, more or less, by cross-bars C. Each section is hung upon its own axle, and the sections move independently of each other. At $b'$ is shown the hooks on the support-plates, into which drops one end of the cultivator-rods $v$. Each section has its own rod $v$, one end resting in the hooks, as aforesaid, and the other in a bearing affixed to the draft-pole and hollow axle, so that the teeth may be readily attached and detached. $m$ is the cultivator-tooth, pivoted between the double cultivator-bars U, at $p'$, and having a slotted brace, $n$, secured to its upper end by bolt $p$. This brace is secured to the bar U by a bolt, $o$, so that the tooth may be set at various angles to its bar. D is a connecting-rod, pivoted between the bars U, and passing through a slot in cross-bar C, in which it is adjusted by a nut on top, so as to allow the rising and falling of the several teeth $m$. $l$ is a lever used to raise the sections of the cultivator from the ground, pivoted at U to cross-bar $c$, and turned under axle $j$ when used.

What I claim is—

In a seeder and planter, the combination, with the seed-box, of the support-plates B, having jaws $e$ $e$ and hooks $b'$, brace $c$, eye $d$, and axle $j$, substantially as set forth.

EZRA EMMERT.

Witnesses:
EUGENE PINCKNEY,
I. C. VIELE.